(12) United States Patent
Fujiyama et al.

(10) Patent No.: US 10,611,870 B2
(45) Date of Patent: Apr. 7, 2020

(54) POLYMER, PRODUCTION METHOD FOR SAME, AND MOLDED ARTICLE

(71) Applicant: Mitsubishi Chemical Corporation, Tokyo (JP)

(72) Inventors: Kousuke Fujiyama, Otake (JP); Masanari Nishimura, Otake (JP); Shingo Hikita, Otake (JP); Fuminori Nakaya, Otake (JP); Taeko Oonuma, Otake (JP); Tetsuya Noda, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 15/029,504

(22) PCT Filed: Oct. 14, 2014

(86) PCT No.: PCT/JP2014/077312
§ 371 (c)(1),
(2) Date: Apr. 14, 2016

(87) PCT Pub. No.: WO2015/056668
PCT Pub. Date: Apr. 23, 2015

(65) Prior Publication Data
US 2016/0237192 A1    Aug. 18, 2016

(30) Foreign Application Priority Data

Oct. 16, 2013   (JP) .................. 2013-215378
Oct. 16, 2013   (JP) .................. 2013-215379

(51) Int. Cl.
| C08F 265/06 | (2006.01) |
| C08F 290/04 | (2006.01) |
| C08F 2/38 | (2006.01) |
| C08F 2/18 | (2006.01) |
| C08F 210/14 | (2006.01) |
| C08F 293/00 | (2006.01) |
| C08F 220/14 | (2006.01) |

(52) U.S. Cl.
CPC ............. *C08F 265/06* (2013.01); *C08F 2/18* (2013.01); *C08F 2/38* (2013.01); *C08F 210/14* (2013.01); *C08F 220/14* (2013.01); *C08F 290/04* (2013.01); *C08F 293/005* (2013.01); *C08F 2438/00* (2013.01)

(58) Field of Classification Search
None
See application file for complete search history.

(56) References Cited

U.S. PATENT DOCUMENTS

| 5,264,530 A | 11/1993 | Darmon et al. |
| 5,362,826 A | 11/1994 | Berge et al. |
| 5,371,151 A | 12/1994 | Berge et al. |
| 5,773,534 A * | 6/1998 | Antonelli ............. C08F 2/38 526/273 |
| 6,117,921 A | 9/2000 | Ma et al. |
| 6,174,953 B1 | 1/2001 | Huybrechts |
| 2002/0054996 A1 | 5/2002 | Van Rheenen |
| 2002/0055587 A1 | 5/2002 | Lau et al. |
| 2006/0100353 A1 | 5/2006 | Barsotti et al. |

(Continued)

FOREIGN PATENT DOCUMENTS

| EP | 0319622 A1 * | 6/1989 |
| EP | 2 937 367 A1 | 10/2015 |
| JP | 10-087768 A | 4/1998 |

(Continued)

OTHER PUBLICATIONS

Thermal transitions of Homopolymers https://www.sigmaaldrich.com/technical-documents/articles/materials-science/polymer-science/thermal-transitions-of-homopolymers.html Jul. 25, 2018.*

(Continued)

*Primary Examiner* — Irina S Zemel
*Assistant Examiner* — Jeffrey S Lenihan
(74) *Attorney, Agent, or Firm* — Oblon, McClelland, Maier & Neustadt, L.L.P.

(57) ABSTRACT

The present application pertains to a production method for a polymer, including a step for polymerizing a starting material composition (I) that includes: a monomer mixture (I-1) containing a macromonomer (a) represented by the following formula (1), and (b) a vinyl monomer; and 0.01 to 5 parts by mass of a non-metallic chain transfer agent with respect to 100 parts by mass of the monomer mixture (I-1); a polymer obtained by the production method; and a molded article. According to the present invention, there can be provided a polymer having exceptional resistance to dwell-induced degradation, and a molded article having exceptional yellowing resistance, a low haze value, and exceptional pliability.

[Chem. 1]

$$H_2C=C\begin{pmatrix}C=O\\R-O\end{pmatrix}-CH_2-C(X_1)\begin{pmatrix}R^1\\O\\C=O\end{pmatrix}-CH_2-C(X_2)\begin{pmatrix}R^2\\O\\C=O\end{pmatrix}-CH_2\cdots C(X_n)\begin{pmatrix}R^n\\O\\C=O\end{pmatrix}-CH_2-Z \quad (1)$$

12 Claims, No Drawings

(56) References Cited

U.S. PATENT DOCUMENTS

2008/0139739 A1   6/2008  Ma
2016/0185893 A1   6/2016  Oonuma et al.

FOREIGN PATENT DOCUMENTS

| JP | 11-124402 A    | 5/1999  |
| JP | 2000-355605 A  | 12/2000 |
| JP | 2002-504575 A  | 2/2002  |
| JP | 2004-509195 A  | 3/2004  |
| JP | 2006-160995 A  | 6/2006  |
| JP | 2015-157903    | 9/2015  |
| WO | 99/042505 A1   | 8/1999  |
| WO | 2014/098141 A1 | 6/2014  |

OTHER PUBLICATIONS

International Search Report dated Dec. 22, 2014 in PCT/JP2014/077312 Filed Oct. 14, 2014.
Extended European Search Report dated Aug. 22, 2016 in Patent Application No. 14854782.1.
Office Action as received in the corresponding Japanese Patent Application No. 2014-553005 dated Mar. 6, 2018 w/English translation.
Office Action as received in the corresponding IN Patent Application No. 201647013173 dated Jun. 27, 2019.

* cited by examiner

POLYMER, PRODUCTION METHOD FOR SAME, AND MOLDED ARTICLE

TECHNICAL FIELD

The present invention relates to a polymer, a production method for the same, and a molded article.

The invention is based upon and claims the benefit of priority of the prior Japanese Patent Application Nos. 2013-215378 and 2013-215379 filed on Oct. 16, 2013, the entire contents of which are incorporated herein by reference.

BACKGROUND ART

Many of monomers having reactive unsaturated bonds can produce polymers by performing a reaction under an appropriate condition by means of a catalyst for causing a chain reaction. Such monomers having unsaturated bonds can be typified, for example, by versatile monomers including vinyl compounds such as styrene, alkylstyrene, and alkoxystyrene. In addition, a wide variety of polymers each having a different property are synthesized by copolymerizing such vinyl compounds alone or copolymerizing these vinyl compounds with each other. When these polymers are industrially used, a homopolymer using one kind of monomer cannot satisfy diverse conditions that are required for a material. For this reason, a method of mixing heterogeneous polymers is employed. However, simple mixing of heterogeneous polymers yields separation of polymers that are not miscible with each other (referred to as macro phase separation), and thus a mixture of heterogeneous polymers does not exhibit characteristics of each polymer in many cases.

For solving the problems above, known is a block copolymer in which two or more polymer segments are chemically bonded to each other. In the mixture of heterogeneous polymers, phase separation occurs since polymers are not easily miscible with each other as described above. However, in the block polymer, the phase separation structure thereof has a size of nanometer (referred to as micro phase separation) since the polymer segments are chemically bonded to each other. For such reasons, characteristics of each polymer segment can be exhibited without inhibiting the characteristics of each polymer segment. Among the block copolymers, a (meth)acrylic block copolymer is being applied for various uses which require transparency or weather resistance.

Further, an acrylic resin molded article has exceptional transparency, but has a problem that it is hard and brittle. As a method of obtaining a transparent and pliable acrylic resin molded article, generally known is a method of adding core-shell-type rubber particles to an acrylic resin molded article. However, in the method, since rubber particles are produced by emulsion polymerization, the particle diameter of the rubber particles becomes 100 nm or more, and thus there is a problem that sufficient pliability cannot be achieved in an acrylic resin molded article added with these rubber particles.

For solving the problems above, known is an acrylic resin molded article obtained by using the above-described (meth)acrylic block copolymer in which two or more polymer segments are chemically bonded to each other. The phase separation structure of the (meth)acrylic block copolymer has micro phase separation since (meth)acrylic block copolymers are chemically bonded to each other. For this reason, characteristics of each polymer segment can be exhibited without inhibiting the characteristics of each polymer segment. Therefore, as compared to the method of adding core-shell-type rubber particles, it is expected to obtain an acrylic resin molded article having exceptional transparency and pliability.

As a method for producing a (meth)acrylic block copolymer, for example, the following method is proposed in Patent Document 1. Patent Document 1 describes a method in which a macromonomer, which is produced by using a cobalt chain transfer agent having a very high chain transfer constant, is used as a chain transfer agent, and then the macromonomer is copolymerized with another (meth) acrylic monomer in a solution to thereby obtain a (meth) acrylic block polymer. In Patent Document 1, the block copolymer is produced by a solution polymerization method or an emulsion polymerization method. In the method for producing a block copolymer by a solution polymerization method, the obtained block copolymer solution (hereinafter, referred to as the polymer solution) can be directly used for use as a coating material, but when the obtained polymer solution is used for an application other than a coating material, a recovery step of the polymer such as re-precipitation is required. Further, in the solution polymerization method, environmental load is large in terms of using a solvent in the recovery step. In addition, in an emulsion polymerization method, heat stability or transparency of a block copolymer to be obtained may be deteriorated due to a residual of an emulsifying agent in some cases.

CITATION LIST

Patent Document

Patent Document 1: JP 2000-355605 A

SUMMARY OF THE INVENTION

Problem to be Solved by the Invention

As a production method having less environmental load and allowing easier recovery of a polymer than the solution polymerization method, a suspension polymerization method is known. However, in a case in which a macromonomer and a vinyl monomer such as a (meth)acrylic monomer are copolymerized by suspension polymerization, there is a problem that a polymer to be obtained does not have sufficient resistance to dwell-induced degradation. The reason for this is considered that reaction in suspension polymerization is rapidly performed by a gel effect as compared to the solution polymerization method, and thus a large amount of unreacted macromonomer remains. In addition, there is also a problem that a molded article obtained by using this polymer does not have sufficient yellowing resistance. For this reason, the polymer produced by the method in the related art is difficult to apply to outdoor application from the viewpoint of weather resistance.

In this regard, a first object of the invention is to provide a polymer which is obtained by polymerizing a macromonomer and a vinyl monomer and has exceptional resistance to dwell-induced degradation, a method for producing the polymer, and a molded article having exceptional yellowing resistance which is obtained by using the polymer.

In addition, in a case in which a monomer having a different polarity from a macromonomer is copolymerized by suspension polymerization, there is a problem that a haze of a molded article molded by using the obtained polymer is high.

In this regard, a second object of the invention is to provide a polymer from which a molded article having exceptional transparency and pliability can be obtained even when a macromonomer and a vinyl monomer are polymerized by a suspension polymerization method, a production method therefor, and a molded article.

Means for Solving Problem

A first embodiment of the invention is as follows.

[1] A polymer obtained by polymerizing a monomer mixture containing a macromonomer (a) represented by the following Formula (1) and a vinyl monomer, in which a 5% by mass reduction temperature is 300° C. or higher.

[Chem. 1]

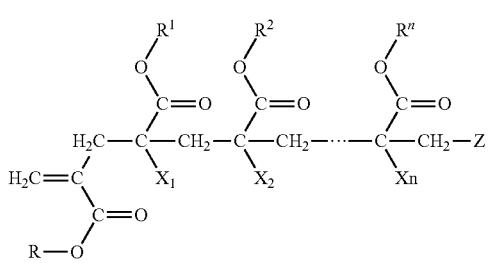

(In Formula (1), R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents an integer of 2 to 10,000.)

[2] A method for the polymer described in [1], the method including: polymerizing a starting material composition that includes 100 parts by mass of a monomer mixture containing the macromonomer (a) and the vinyl monomer and 0.01 to 0.5 part by mass of a non-metallic chain transfer agent.

[3] The polymer described in [1], in which the polymerization of the monomer mixture is suspension polymerization.

[4] The method for producing the polymer described in [2], in which the polymerization of the starting material composition is suspension polymerization.

[5] A molded article obtained by molding the polymer described in [1].

[6] A molded article obtained by molding a polymer obtained by the production method described in [2].

A second embodiment of the invention is as follows.

[1] A polymer obtained by polymerizing a monomer mixture containing a macromonomer (a) represented by the following Formula (1) and a vinyl monomer, in which a molecular weight distribution (mass average molecular weight (Mw)/number average molecular weight (Mn)) is 23 or less and an elastic modulus is 1,000 MPa or less.

[Chem. 2]

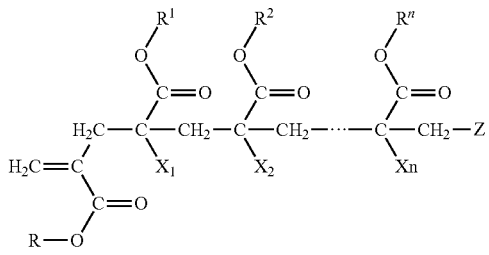

(In Formula (1), R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents an integer of 2 to 10,000.)

[2] The polymer described in [1], in which the polymerization of the monomer mixture is suspension polymerization.

[3] The polymer described in [1] or [2], in which a mass average molecular weight of the polymer is 100,000 or more.

[4] The polymer described in any one of [1] to [3], in which a 5% by mass reduction temperature of the polymer is 300° C. or higher.

[5] A molded article obtained by molding the polymer described in any one of [1] to [4].

[6] The molded article described in [5], in which the molding is melt molding.

[7] The molded article described in [6], in which the molded article is an extruded film.

[8] A molded article obtained by molding a polymer obtained by polymerizing a starting material composition that includes 100 parts by mass of a monomer mixture containing a macromonomer (a) represented by the following Formula (1) and a vinyl monomer and 0.01 to 0.5 part by mass of a sulfur-containing chain transfer agent.

[Chem. 3]

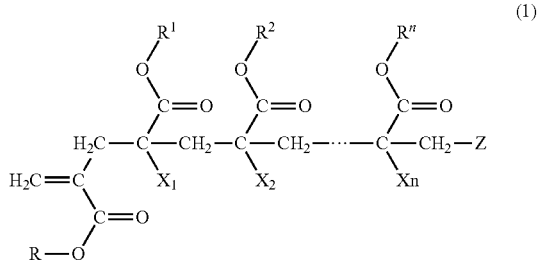

(In Formula (1), R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents an integer of 2 to 10,000.)

[9] The molded article described in [8], in which the molding is melt molding.

[10] The molded article described in [9], in which the molded article is an extruded film.

In addition, the invention has the following aspects.

<1> A method for producing a polymer, including: a step of polymerizing a starting material composition (I) that includes a monomer mixture (I-1) containing a macromonomer (a) represented by the following Formula (1) and a vinyl monomer (b) and 0.01 to 5 parts by mass of a non-metallic chain transfer agent with respect to 100 parts by mass of the monomer mixture (I-1).

[Chem. 4]

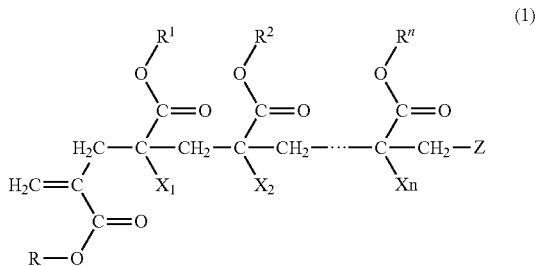

(In Formula (1), R and $R^1$ to $R^n$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents an integer of 2 to 10,000.)

<2> The method for producing a polymer described in <1>, in which the polymerization of the starting material composition (1) is performed by suspension polymerization.

<3> The method for producing a polymer described in <1> or <2>, in which the macromonomer (a) is obtained by polymerizing a starting material composition (II) that includes: a monomer composition (II-1) containing a (meth)acrylic acid ester; and a cobalt chain transfer agent.

<4> The method for producing a polymer described in <3>, in which the monomer composition (II-1) contains 85 to 99% by mass of methacrylic acid ester and 1 to 15% by mass of acrylic acid ester with respect to the total mass of the monomer composition (II-1).

<5> The method for producing a polymer described in any one of <1> to <4>, in which the vinyl monomer (b) includes a vinyl monomer (b-1) having a Tg of homopolymer of 25° C. or higher and a vinyl monomer (b-2) having a Tg of homopolymer of lower than 25° C., and a content (X % by mass) of the vinyl monomer (b-1) in the vinyl monomer (b) and a content (Y % by mass) of the macromonomer (a) in the monomer mixture (I-1) satisfy the following Formulae (2) and (3).

$$45 \geq Y \geq -0.5X+45 \quad (2)$$

$$5 \leq X \leq 55 \quad (3)$$

<6> The method for producing a polymer described in any one of <1> to <4>, in which the vinyl monomer (b) includes a vinyl monomer (b-1) having a Tg of homopolymer of 25° C. or higher and a vinyl monomer (b-2) having a Tg of homopolymer of lower than 25° C., and a content (X % by mass) of the vinyl monomer (b-1) in the vinyl monomer (b) and a content (Y % by mass) of the macromonomer (a) in the monomer mixture (I-1) satisfy the following Formulae (4) and (5).

$$45 \geq Y \geq -X+75 \quad (4)$$

$$30 < X < 75 \quad (5)$$

<7> The method for producing a polymer described in any one of <1> to <4>, in which the vinyl monomer (b) includes a vinyl monomer (b-1) having a Tg of homopolymer of 25° C. or higher and a vinyl monomer (b-2) having a Tg of homopolymer of lower than 25° C., and a content (X % by mass) of the vinyl monomer (b-1) in the vinyl monomer (b) and a content (Y % by mass) of the macromonomer (a) in the monomer mixture (I-1) satisfy the following Formulae (6) and (7).

$$5 \leq Y \leq 45 \quad (6)$$

$$75 \leq X \leq 100 \quad (7)$$

<8> The method for producing a polymer described in any one of <1> to <7>, in which the vinyl monomer (b) contains a (meth)acrylic acid ester.

<9> A polymer produced by the method for producing a polymer described in any one of <1> to <8>.

<10> The polymer described in <9>, in which a molecular weight distribution (mass average molecular weight/number average molecular weight) is 23 or less.

<11> The polymer described in <9> or <10>, in which a mass average molecular weight is 100,000 or more.

<12> The polymer described in any one of <9> to <11>, in which a 5% by mass reduction temperature is 280° C. or higher.

<13> The polymer described in any one of <9> to <12>, in which a melt index retention rate is 95 to 110%.

<14> The polymer described in any one of <9> to <13>, in which an elastic modulus is 1,000 MPa or less.

<15> A molded article obtained by molding a molding material containing the polymer described in any one of <9> to <14>.

Effect of the Invention

According to the first embodiment of the invention, by polymerizing a specific macromonomer and a vinyl monomer under a specific condition, it is possible to obtain a polymer having favorable resistance to dwell-induced degradation and a production method therefor and to obtain a molded article having exceptional yellowing resistance by using the polymer. Further, a molded article obtained by molding a molding material containing the polymer of the invention can be suitably used as an acrylic resin molded article for use in building materials.

According to the second embodiment of the invention, it is possible to provide a polymer from which a molded article having exceptional transparency can be obtained even when being produced by a suspension polymerization method, particularly, an acrylic resin molded article having a low haze value and exceptional pliability and used for optical applications can be obtained, and a production method therefor.

MODE(S) FOR CARRYING OUT THE INVENTION

[Method for Producing Polymer]

In an aspect of the invention, the method for producing a polymer is characterized by including: a step of polymerizing a starting material composition (I) that includes a monomer mixture (I-1) containing a macromonomer (a) represented by the following Formula (1) and a vinyl monomer (b) and 0.01 to 5 parts by mass of a non-metallic chain transfer agent with respect to 100 parts by mass of the monomer mixture (I-1).

[Chem. 5]

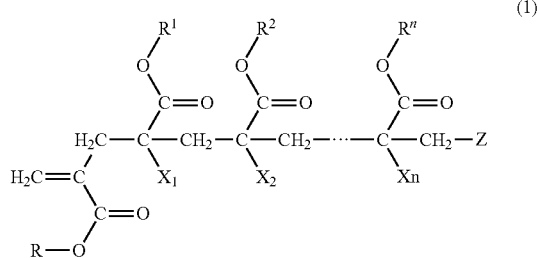

(1)

(In Formula (1), R and $R^1$ to $R''$ each independently represent a hydrogen atom, an alkyl group, a cycloalkyl group, an aryl group, or a heterocyclic group, $X_1$ to $X_n$ each independently represent a hydrogen atom or a methyl group, Z represents a terminal group, and n represents an integer of 2 to 10,000.)

(Starting Material Composition (I))

In an aspect of the invention, the starting material composition (I) includes the monomer mixture (I-1) containing the macromonomer (a) represented by the above Formula (1) and the vinyl monomer (b) and 0.01 to 5 parts by mass of the non-metallic chain transfer agent with respect to 100 parts by mass of the monomer mixture (I-1). Hereinafter, each component will be sequentially described.

<Monomer Mixture (I-1)>

The monomer mixture (I-1) contains the macromonomer (a) and the vinyl monomer (b).

In the invention, the content of the macromonomer (a) in the monomer mixture (I-1) is preferably 15% by mass or more but 60% by mass or less with respect to the total mass of the monomer mixture (I-1). When the content of the macromonomer (a) is 15% by mass or more with respect to the total mass of the monomer mixture (I-1), mechanical strength and transparency of a molded article obtained from a molding material containing a polymer obtained by the production method of the invention tend to be improved. In addition, when the content of the macromonomer (a) is 60% by mass or less with respect to the total mass of the monomer mixture (I-1), dispersion stability to water during suspension polymerization tends to be improved, and mechanical strength and transparency of the molded article tend to be improved. The lower limit value of the content of the macromonomer (a) is more preferably 20% by mass or more, and further preferably 25% by mass or more. The upper limit value of the content of the macromonomer (a) is more preferably 55% by mass or less, and further preferably 50% by mass or less.

Further, from the viewpoint of dispersion stability during suspension polymerization, the content of the macromonomer (a) in the monomer mixture (I-1) is further preferably 25% by mass or more but 45% by mass or less.

Further, the content of the vinyl monomer (b) in the monomer mixture (I-1) is preferably 40% by mass or more but 85% by mass or less. When the content of the vinyl monomer (b) is 85% by mass or less, mechanical strength and transparency of the molded article tend to be improved. In addition, when the content of the vinyl monomer (b) in the monomer mixture (I-1) is 40% by mass or more, dispersion stability during suspension polymerization tends to be improved, and mechanical strength and transparency of the molded article tend to be improved. The upper limit of the vinyl monomer (b) in the monomer mixture (I-1) is more preferably 80% by mass or less, and further preferably 75% by mass or less. The lower limit of the content of the vinyl monomer (b) in the monomer mixture (I-1) is more preferably 45% by mass or more, and further preferably 50% by mass or more. In addition, the total content of the macromonomer (a) and the vinyl monomer (b) in the monomer mixture (I-1) does not exceed 100% by mass. Further, a case in which the total amount of the macromonomer (a) and the vinyl monomer (b) is less than 100% by mass means that other components are included in the monomer mixture (I-1).

Examples of the form of the monomer mixture (I-1) include a syrup in which the macromonomer (a) is dissolved in the vinyl monomer (b). Herein, the term "syrup" means a liquid product in which the macromonomer is dissolved in the vinyl monomer.

<Macromonomer (a)>

The macromonomer (a) in the invention is included in the monomer mixture (I-1) and is one of constituents of the polymer of the invention.

The macromonomer generally means a high molecular weight monomer having a polymerizable functional group.

In the invention, the macromonomer (a) is represented by the above General Formula (1). That is, the macromonomer (a) has a group having a radical-polymerizable unsaturated double bond at one terminal of a poly(meth)acrylic acid ester segment and is also called alias macromer. Incidentally, in this specification, "(meth)acrylic acid" indicates "acrylic acid" or "methacrylic acid." Further, in this specification, one terminal of a poly(meth)acrylic acid ester segment is a terminal group of the carbon-carbon bond chain in which unsaturated double bond parts of a (meth)acrylic acid ester are opened and connected to each other as in the above Formula (1), and means a group positioned at the opposite side to Z. Further, in Formula (1), " . . . " indicates the state in which a monomer unit is polymerized.

In General Formula (1), R and $R^1$ to $R''$ each independently represent a hydrogen atom, an alkyl group, a cycloalkyl group, an aryl group, or a heterocyclic group. An alkyl group, a cycloalkyl group, an aryl group, or a heterocyclic group can have a substituent.

Examples of the alkyl group of R or $R^1$ to $R''$ include a branched or linear alkyl group having 1 to 20 carbon atoms. Specific examples of the branched or linear alkyl group having 1 to 20 carbon atoms include a methyl group, an ethyl group, an n-propyl group, an i-propyl group, an n-butyl group, a t-butyl group, an i-butyl group, a pentyl group, a hexyl group, a heptyl group, an octyl group, a nonyl group, a decyl group, an undecyl group, a dodecyl group, a tridecyl group, a tetradecyl group, a pentadecyl group, a hexadecyl group, a heptadecyl group, an octadecyl group, a nonadecyl group, and an icosyl group. Among these, from the viewpoint of ease of availability, a methyl group, an ethyl group, an n-propyl group, an i-propyl group, an n-butyl group, a t-butyl group, a pentyl group, a hexyl group, a heptyl group, and an octyl group are preferable, a methyl group, an ethyl group, an n-propyl group, an i-propyl group, an n-butyl group, and a t-butyl group are more preferable, and a methyl group is particularly preferable.

Examples of the cycloalkyl group of R or $R^1$ to $R''$ include a cycloalkyl group having 3 to 20 carbon atoms. Specific examples of the cycloalkyl group having 3 to 20 carbon atoms include a cyclopropyl group, a cyclobutyl group, a cyclopentyl group, a cyclohexyl group, a cycloheptyl group, a cyclooctyl group, and an adamantyl group. From the viewpoint of ease of availability, a cyclopropyl group, a cyclobutyl group, and an adamantyl group are preferable.

Examples of the aryl group of R or $R^1$ to $R''$ include an aryl group having 6 to 18 carbon atoms. Specific examples of the aryl group having 6 to 18 carbon atoms include a phenyl group and a naphthyl group.

Examples of the heterocyclic group of R or $R^1$ to $R''$ include a heterocyclic group having 5 to 18 carbon atoms. Specific examples of the heterocyclic group of R or $R^1$ to $R''$ include a γ-lactone group and an ε-caprolactone group. Examples of a hetero atom included in a heterocycle include an oxygen atom, a nitrogen atom, and a sulfur atom.

Examples of substituents of groups of R or $R^1$ to $R''$ each independently include a group or atom selected from the group consisting of an alkyl group, an aryl group, a carboxyl group, an alkoxycarbonyl group (—COOR'), a carbamoyl group (—CONR'R"), a cyano group, a hydroxyl group, an amino group (—NR'R"), halogen, an allyl group, an epoxy group, an alkoxy group (—OR'), and a hydrophilic or ionic group. Incidentally, examples of R' or R" each independently include the same groups as R excluding the heterocyclic group.

Examples of the alkoxycarbonyl group of the substituent of groups of R or $R^1$ to $R''$ include a methoxycarbonyl group.

Examples of the carbamoyl group of the substituent of groups of R or $R^1$ to $R''$ include an N-methylcarbamoyl group and an N,N-dimethylcarbamoyl group.

Examples of the halogen of the substituent of groups of R or $R^1$ to $R''$ include fluorine, chlorine, bromine, and iodine.

Examples of the alkoxy group of the substituent of groups of R or $R^1$ to $R''$ include an alkoxy group having 1 to 12 carbon atoms, and specific examples thereof include a methoxy group.

Examples of the hydrophilic or ionic group of the substituent of groups of R or $R^1$ to $R''$ include an alkali salt of a carboxyl group or an alkali salt of a sulfoxyl group, a poly(alkylene oxide) group such as a polyethylene oxide group or a polypropylene oxide group, and a cationic substituent such as a quaternary ammonium base.

R and $R^1$ to $R''$ are preferably at least one selected from an alkyl group and a cycloalkyl group, and more preferably an alkyl group.

From the viewpoint of ease of availability, as the alkyl group, a methyl group, an ethyl group, an n-propyl group, an i-propyl group, an n-butyl group, a t-butyl group, a pentyl group, a hexyl group, a heptyl group, and an octyl group are preferable, a methyl group, an ethyl group, an n-propyl group, an i-propyl group, an n-butyl group, and a t-butyl group are more preferable, and a methyl group is particularly preferable.

$X_1$ to $X_n$ are at least one selected from a hydrogen atom and a methyl group, and a methyl group is preferable.

From the viewpoint of ease of synthesis of macromonomer (a), as $X_1$ to $X_n$, it is preferable that a half or more of $X_1$ to $X_n$ be a methyl group. In order to make a half or more of $X_1$ to $X_n$ be a methyl group, the ratio of the methacrylic acid ester in a starting material composition (II) for producing the macromonomer (a) to be described later may be set to 80% by mass or more.

Z is a terminal group of the macromonomer (a). Examples of the terminal group of the macromonomer (a) include a group derived from a hydrogen atom and a radical polymerization initiator in the same manner as the terminal group of the polymer obtained by known radical polymerization.

n represents the number of moles of the monomer unit (provided that, the number of the monomer units having a double bond is excluded) contained in one molecule of the macromonomer (a). n in "$R''$" means the same number. That is, 1 to n of $R^1$ to $R''$ ($R^1$, $R^2$, $R^3$ ... $R''$) are present so as to correspond to the number of the monomer units (provided that, the number of the monomer units having a double bond is excluded) constituting the macromonomer (a). n is an integer of 2 to 10,000. n is preferably 10 to 1,000, and more preferably 30 to 500.

(Starting Material Composition (II))

As the starting material composition (II) for obtaining the macromonomer (a) represented by the above-described Formula (1), for example, it is preferable to include: a monomer composition (II-1) containing a (meth)acrylic acid ester; and a cobalt chain transfer agent.

(Monomer Composition (II-1))

Examples of the (meth)acrylic acid ester contained in the monomer composition (II-1) include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, isoamyl (meth)acrylate, hexyl (meth)acrylate, octyl (meth)acrylate, lauryl (meth)acrylate, dodecyl (meth)acrylate, stearyl (meth)acrylate, phenyl (meth)acrylate, benzyl (meth)acrylate, glycidyl (meth)acrylate, 2-ethylhexyl (meth)acrylate, 2-hydroxyethyl (meth)acrylate, 2-hydroxypropyl (meth)acrylate, 2-hydroxybutyl (meth)acrylate, 3-hydroxybutyl (meth)acrylate, 4-hydroxybutyl (meth)acrylate, polyethylene glycol (meth)acrylate, polypropylene glycol (meth)acrylate, methoxyethyl (meth)acrylate, ethoxyethyl (meth)acrylate, n-butoxyethyl (meth)acrylate, isobutoxyethyl (meth)acrylate, t-butoxyethyl (meth)acrylate, phenoxyethyl (meth)acrylate, nonylphenoxyethyl (meth)acrylate, 3-methoxybutyl (meth)acrylate, PLACCEL FM (trade name, a caprolactone addition monomer of (meth)acrylic acid ester, manufactured by Daicel Corporation), BLEMMER PME-100 (trade name, methoxypolyethylene glycol methacrylate (one having two chains of ethylene glycol), manufactured by NOF CORPORATION), BLEMMER PME-200 (trade name, methoxypolyethylene glycol methacrylate (one having four chains of ethylene glycol), manufactured by NOF CORPORATION), BLEMMER PME-400 (trade name, methoxypolyethylene glycol methacrylate (one having nine chains of ethylene glycol), manufactured by NOF CORPORATION), BLEMMER 50POEP-800B (trade name, octoxypolyethylene glycol-polypropylene glycol-methacrylate (one having eight chains of ethylene glycol and six chains of propylene glycol), manufactured by NOF CORPORATION) and BLEMMER 20ANEP-600 (trade name, nonylphenoxy (ethylene glycol-polypropylene glycol) monoacrylate, manufactured by NOF CORPORATION), BLEMMER AME-100 (trade name, manufactured by NOF CORPORATION), BLEMMER AME-200 (trade name, manufactured by NOF CORPORATION), and BLEMMER 50AOEP-800B (trade name, manufactured by NOF CORPORATION). These may be used alone or in combination of two or more kinds thereof.

Among these, from the viewpoint of ease of availability of a monomer, a methacrylic acid ester is preferable.

As the methacrylic acid ester, from the viewpoint of transparency of a molded article, methyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, and 4-hydroxybutyl methacrylate are preferable, methyl methacrylate, n-butyl methacrylate, and 2-ethylhexyl methacrylate are more preferable, and methyl methacrylate is particularly preferable.

Further, from the viewpoint of obtaining a polymer having exceptional resistance to dwell-induced degradation, the monomer composition (I-1) for obtaining the macromonomer (a) preferably contains an acrylic acid ester in addition to the methacrylic acid ester.

Examples of the acrylic acid ester include methyl acrylate, ethyl acrylate, n-propyl acrylate, isopropyl acrylate, n-butyl acrylate, isobutyl acrylate, and t-butyl acrylate. Among these, from the viewpoint of ease of availability, methyl acrylate is preferable.

From the viewpoint of resistance to dwell-induced degradation of a molded article, the content of the methacrylic acid ester in the monomer composition (II-1) is preferably 80% by mass or more but 99.5% by mass or less with respect to the total mass of the monomer composition (II-1). In addition, the lower limit of the content of the methacrylic acid ester is more preferably 82% by mass or more, and further preferably 84% by mass or more. The upper limit of the content of the methacrylic acid ester is more preferably 99% by mass or less, and further preferably 98% by mass or less. In an aspect of the invention, the content of the methacrylic acid ester is preferably 80% by mass or more but 99.5% by mass or less, preferably 82% by mass or more but 99% by mass or less, further preferably 84% by mass or more but 99% by mass or less, and particularly preferably 85% by mass or more but 99% by mass or less, with respect to the total amount of the monomer composition (II-1).

Further, the content of the acrylic acid ester in the monomer composition (II-1) is preferably 0.1 to 30% by mass, and more preferably 1 to 15% by mass, with respect to the total mass of the monomer composition (II-1).

In an aspect of the invention, the monomer composition (II-1) preferably contains 85 to 99% by mass of methacrylic acid ester and 1 to 15% by mass of acrylic acid ester with respect to the total mass of the monomer composition (II-1). Further, when the total amount of the methacrylic acid ester and the acrylic acid ester in the monomer composition (II-1) is less than 100% by mass, the monomer composition (II-1) may contain other components.

In the invention, the macromonomer (a) can contain an unsaturated carboxylic acid unit such as (meth)acrylic acid as a monomer unit depending on the purpose. That is, as other components in the monomer composition (II-1), an unsaturated carboxylic acid is preferable.

Examples of the unsaturated carboxylic acid include (meth)acrylic acid, maleic acid, and maleic anhydride.

Regarding a monomer for obtaining the macromonomer (a), the monomer described above can be used alone or in combination of two or more kinds thereof.

The mass average molecular weight (hereinafter, also referred to as "Mw") of the macromonomer (a) is preferably 1,000 or more but 1,000,000 or less. When the Mw of the macromonomer (a) is 1,000 or more, properties of a molded article, particularly, mechanical properties thereof tend to be improved. The lower limit of the Mw of the macromonomer (a) is more preferably 3,000 or more, and further preferably 5,000 or more. In addition, the upper limit of the Mw of the macromonomer (a) is more preferably 500,000 or less, and further preferably 300,000 or less. That is, the mass average molecular weight of the macromonomer (a) is preferably 1,000 or more but 1,000,000 or less, more preferably 3,000 or more but 500,000 or less, and particularly preferably 5,000 or more but 300,000 or less. The mass average molecular weight of the macromonomer (a) means a value calculated from a calibration curve of PMMA using gel permeation chromatography (GPC).

The molecular weight distribution (mass average molecular weight/number average molecular weight) of the macromonomer (a) is preferably 1.0 to 5.0, and more preferably 1.5 to 3.0.

In an aspect of the invention, as the macromonomer (a), the macromonomer represented by Formula (1) described above can be used alone or in combination of two or more kinds thereof.

Examples of the method for producing the macromonomer (a) include a method for producing the macromonomer (a) by using a cobalt chain transfer agent (U.S. Pat. No. 4,680,352), a method using an α-substituted unsaturated compound such as α-bromomethylstyrene as a chain transfer agent (WO 88/04304 A), a method of chemically bonding a polymerizable group (JP 60-133007 A and U.S. Pat. No. 5,147,952), and a method of utilizing thermal decomposition (JP 11-240854 A).

Among these, a method for producing the macromonomer (a) by using a cobalt chain transfer agent is preferable as the method for producing the macromonomer (a) from the viewpoint of having few production steps and using a catalyst with a high chain transfer constant. That is, the macromonomer (a) is preferably obtained by polymerizing the starting material composition (II) including: the above-described monomer composition (II-1) containing a (meth) acrylic acid ester; and a cobalt chain transfer agent. When a cobalt chain transfer agent having a high chain transfer constant is used, it is possible to obtain a macromonomer having a suppressed molecular weight with a small amount of the chain transfer agent.

Examples of the method for producing the macromonomer (a) by using a cobalt chain transfer agent include a bulk polymerization method, a solution polymerization method, and an aqueous dispersion polymerization method such as a suspension polymerization method or an emulsion polymerization method.

As the cobalt chain transfer agent, those described in U.S. Pat. No. 4,680,352 described above may be used.

As for the cobalt chain transfer agent, a monovalent cobalt complex, which is obtained by reaction of cobalt (II) acetate, diphenyl glyoxime, and a diethyl ether boron trifluoride complex, may be used as a chain transfer agent.

In an aspect of the invention, the added amount of the cobalt chain transfer agent used for producing the macromonomer (a) in the monomer composition (II-1) is preferably 0.1 ppm to 50 ppm, and more preferably 1 ppm to 25 ppm.

Examples of a solvent used at the time of obtaining the macromonomer (a) by a solution polymerization method include a hydrocarbon-based solvent such as toluene; an ether-based solvent such as diethyl ether or tetrahydrofuran; a halogenated hydrocarbon-based solvent such as dichloromethane or chloroform; a ketone-based solvent such as acetone; an alcohol-based solvent such as methanol; a nitrile-based solvent such as acetonitrile; a vinyl ester-based solvent such as ethyl acetate; a carbonate-based solvent such as ethylene carbonate; and supercritical carbon dioxide. These may be used alone or in combination of two or more kinds thereof.

Among these, from the viewpoint of having a simplified recovery step for the macromonomer (a), an aqueous dispersion polymerization method such as an emulsion polymerization method is preferable.

In an aspect of the invention, the macromonomer (a) is produced by a production method including a step of preparing a starting material composition (II) that includes: a dispersion agent; a water-soluble salt; a monomer composition (II-1) containing a (meth)acrylic acid ester; a cobalt chain transfer agent; and a polymerization initiator, and a step of preparing an aqueous suspension containing the macromonomer (a) by performing suspension polymerization on the starting material composition (II) at 70 to 100° C. for 2 to 7 hours. In addition, the production method may include a step of filtering and recovering the macromonomer (a) from the obtained aqueous suspension.

As the dispersion agent, at least one compound selected from dispersion agents to be described below is preferably used. Further, the dispersion agent may be used in the form of an aqueous solution, and in this case, the solid content concentration thereof is preferably 30 to 60% by mass.

Further, examples of the water-soluble salt include sodium sulfate, sodium nitrate, potassium chloride, potassium sulfate, potassium nitrate, lithium chloride, lithium sulfate, and lithium nitrate. Sodium chloride and sodium sulfate are preferable, and sodium sulfate is particularly preferable.

As described above, the macromonomer (a) is preferably obtained by performing suspension polymerization on the monomer composition (II-1) using the cobalt chain transfer agent. The method for producing a polymer of the invention may include a step of preparing the macromonomer (a) before the step of polymerizing a starting material composition (I).

Further, as the macromonomer (a), commercially available products may be used. Specific examples thereof include ELVASITE (registered trademark) series (manufactured by Lucite International).

For producing the polymer to be described below, a powder product obtained by recovery and purification of the macromonomer (a) produced by the above-described method may be used, or an aqueous suspension containing the macromonomer (a) which has been synthesized by suspension polymerization may be used directly.

<Vinyl Monomer (b)>

As the vinyl monomer (b), the same monomer as that contained in the monomer composition (II-1) for obtaining the macromonomer (a) may be used.

In the present specification, the vinyl monomer means a monomer containing at least one vinyl group (unsaturated carbon-carbon double bond).

In the case of obtaining a polymer from which a molded article having high transparency can be produced, for example, (meth)acrylic acid esters can be used as the vinyl monomer (b). Among these, methyl (meth)acrylate, ethyl (meth)acrylate, n-propyl (meth)acrylate, n-butyl (meth)acrylate, lauryl methacrylate, dodecyl methacrylate, stearyl methacrylate, 2-ethylhexyl (meth)acrylate, glycidyl methacrylate, 2-hydroxyethyl (meth)acrylate, and 4-hydroxybutyl (meth)acrylate are preferable. Of them, methyl methacrylate, ethyl methacrylate, n-butyl methacrylate, lauryl methacrylate, dodecyl methacrylate, stearyl methacrylate, 2-ethylhexyl methacrylate, glycidyl methacrylate, 2-hydroxyethyl methacrylate, and 4-hydroxybutyl methacrylate are more preferable.

In an aspect of the invention, in the case of obtaining a polymer from which a molded article having pliability can be produced, for example, acrylic acid esters having 1 to 20 carbon atoms and methacrylic acid esters having 4 to 20 carbon atoms can be used as the vinyl monomer (b). Among these, acrylic acid esters having 1 to 20 carbon atoms are preferable. Among the acrylic acid esters, methyl acrylate, ethyl acrylate, n-propyl acrylate, n-butyl acrylate, 2-ethylhexyl acrylate, 2-hydroxyethyl acrylate, and 4-hydroxybutyl acrylate are more preferable.

Hereinafter, specific examples of the vinyl monomer (b) according to the type of the macromonomer (a) are described.

When a macromonomer in which, in the above-described Formula (1), R and $R^1$ to $R''$ represent a methyl group, $X_1$ to $X_n$ represent a methyl group, and n is 2 to 10,000 (that is, a macromonomer of methyl (meth)acrylate) is used as the macromonomer (a), methyl methacrylate (MMA) and n-butyl acrylate (nBA) are preferably used as the vinyl monomer (b). Further, regarding the contents of the macromonomer (a) and the vinyl monomer (b) in the monomer mixture (I-1), the content of the macromonomer (a) is preferably 15 to 60% by mass, and the content of the vinyl monomer (b) is preferably 40 to 85% by mass.

Further, when a macromonomer in which, in the above-described Formula (1), R and $R^1$ to $R''$ represent a butyl group, $X_1$ to $X_n$ represent a hydrogen atom, and n is 3 to 5000 (that is, a macromonomer of n-butyl acrylate) is used as the macromonomer (a), methyl methacrylate (hereinafter, also referred to as "MMA") and n-butyl acrylate (hereinafter, also referred to as "nBA") are preferably used as the vinyl monomer (b).

Furthermore, when a macromonomer in which, in the above-described Formula (1), R and $R^1$ to $R''$ represent a butyl group, $X_1$ to $X_n$ each independently represent a hydrogen atom or a methyl group, and n is 3 to 5000 (that is, a macromonomer of butyl (meth)acrylate) is used as the macromonomer (a), methyl acrylate (hereinafter, also referred to as "MA") and n-butyl methacrylate (hereinafter, also referred to as "nBMA") are preferably used as the vinyl monomer (b).

Further, when a macromonomer of a copolymer of MMA and MA, that is, a macromonomer in which, in the above-described Formula (1), R and $R^1$ to $R''$ represent a methyl group, $X_1$ to $X_n$ each independently represent a hydrogen atom or a methyl group, and n is 3 to 5000 is used as the macromonomer (a), MMA and nBA are preferably used as the vinyl monomer (b).

The vinyl monomer (b) can be used alone or in combination of two or more kinds thereof.

In an aspect of the invention, it is preferable that the vinyl monomer (b) include a vinyl monomer (b-1) having a glass transition temperature (Tg) of homopolymer of 25° C. or higher and a vinyl monomer (b-2) having a glass transition temperature (Tg) of homopolymer of lower than 25° C., and the content (X % by mass) of the vinyl monomer (b-1) in the vinyl monomer (b) and the content (Y % by mass) of the macromonomer (a) in the monomer mixture (I-1) satisfy the following Formulae (2) and (3).

$$45 \geq Y \geq -0.5X+45 \qquad (2)$$

$$5 \leq X \leq 55 \qquad (3)$$

Herein, X means the content (% by mass) of the vinyl monomer (b-1) with respect to the total mass of the vinyl monomer (b). In addition, Y means the content (% by mass) of the macromonomer (a) with respect to the total mass of the monomer mixture (I-1).

When X and Y satisfy the above Formulae (2) and (3), a molded article molded by using a polymer obtained by the method for producing a polymer of the invention has a low haze value and a molded article having exceptional pliability is obtained, which is preferable.

As the vinyl monomer (b-1) having a glass transition temperature (Tg) of homopolymer of 25° C. or higher, for example, methacrylate such as methyl methacrylate, n-propyl methacrylate, n-stearyl methacrylate, benzyl methacrylate, ethyl methacrylate, cyclohexyl methacrylate, t-butyl methacrylate, phenyl methacrylate, dicyclopentanyl methacrylate, isobornyl methacrylate, or 1-adamanthyl methacrylate, acrylate such as cetyl acrylate, stearyl acrylate, or isobornyl acrylate, acrylic acid, dimethyl acrylamide, or acrylamide is preferable. These may be used alone or in combination of two or more kinds thereof.

As the vinyl monomer (b-2) having a glass transition temperature (Tg) of homopolymer of lower than 25° C., for example, methacrylate such as n-butyl methacrylate, 2-ethylhexyl methacrylate, tri-decyl methacrylate, iso-decyl methacrylate, or n-lauryl methacrylate, and acrylate such as cyclohexyl acrylate, lauryl acrylate, methyl acrylate, hydroxypropyl acrylate, glycerin monoacrylate, hydroxyethyl acrylate, 2-methylbutyl acrylate, 4-hydroxybutyl acrylate, propyl acrylate, octyl acrylate, 2-methoxyethyl acrylate, 2-ethyl hexyl acrylate, n-butyl acrylate, hexyl acrylate, n-pentyl acrylate, nonyl acrylate, heptyl acrylate, octyl acrylate, butyl acrylate, or methyl acrylate are preferable. These may be used alone or in combination of two or more kinds thereof.

Herein, the glass transition temperature of homopolymer of the vinyl monomer means Tg of homopolymer having a molecular weight of 10,000 or more which is obtained by polymerizing one kind of vinyl monomer.

In an aspect of the invention, the ratio of the vinyl monomer (b-2) in the vinyl monomer (b) is preferably 30 to 100% by mass, and more preferably 50 to 90% by mass, with respect to the total mass of the vinyl monomer (b).

Further, it is preferable that the vinyl monomer (b) include a vinyl monomer (b-1) having a Tg of homopolymer of 25° C. or higher and a vinyl monomer (b-2) having a Tg of homopolymer of lower than 25° C. and satisfy the following Formulae (4) and (5).

$$45 \geq Y \geq -X+75 \quad (4)$$

$$30 < X < 75 \quad (5)$$

(In Formulae (4) and (5), X represents the content (% by mass) of the vinyl monomer (b-1) in the vinyl monomer (b) and Y represents the content (% by mass) of the macromonomer (a) in the monomer mixture (I-1).)

Further, it is preferable that the vinyl monomer (b) include a vinyl monomer (b-1) having a Tg of homopolymer of 25° C. or higher and a vinyl monomer (b-2) having a Tg of homopolymer of lower than 25° C. and satisfy the following Formulae (6) and (7).

$$5 \leq Y \leq 45 \quad (6)$$

$$75 \leq X \leq 100 \quad (7)$$

(In Formulae (6) and (7), X represents the content (% by mass) of the vinyl monomer (b-1) in the vinyl monomer (b) and Y represents the content (% by mass) of the macromonomer (a) in the monomer mixture (I-1).)

When X and Y satisfy the above Formulae (4) and (5) or the above Formulae (6) and (7), resistance to dwell-induced degradation of a polymer obtained by the method for producing a polymer of the invention is improved, which is preferable. In addition, yellowing resistance of a molded article is improved, which is preferable.

<Production of Polymer>

The method for producing a polymer of the invention includes a step of polymerizing a starting material composition (I) that includes a monomer mixture (I-1) containing a macromonomer (a) and a vinyl monomer (b) and 0.001 to 5 parts by mass of a non-metallic chain transfer agent with respect to 100 parts by mass of the monomer mixture (I-1).

The polymerization of the starting material composition (I) is preferably performed in water, and is more preferably performed by suspension polymerization.

Further, the starting material composition (I) preferably contains a dispersion agent.

Examples of such a production method include the following method (A) or method (B), and the method (A) and the method (B) have different timing of adding a dispersion agent from each other.

The method (A) is a method in which a monomer mixture (I-1) is prepared by dissolving a macromonomer (a) in a vinyl monomer (b), a starting material composition (I) is prepared by adding a radical polymerization initiator and a non-metallic chain transfer agent to the monomer mixture (I-1), a syrup dispersion of the starting material composition (I) is then prepared by dispersing the starting material composition (I) in an aqueous solution containing a dispersion agent, and the obtained syrup dispersion of the starting material composition (I) is subjected to suspension polymerization.

Further, the method (B) is a method in which a syrup dispersion of a monomer mixture (I-1) is prepared by adding a vinyl monomer (b) to an aqueous suspension containing a macromonomer (a) and a dispersion agent, and a syrup dispersion of a starting material composition (I) is prepared by adding a non-metallic chain transfer agent and a radical polymerization initiator to the syrup dispersion of the monomer mixture (I-1). Thereafter, the syrup dispersion of the starting material composition (I) is subjected to suspension polymerization.

Herein, the term "aqueous suspension" means a state in which a monomer or a syrup is dispersed in water.

In the above-described methods, a polymer obtained by the method (A) tends to exhibit exceptional optical characteristics. In the method (A), since particles having a uniform composition are obtained by preparing a syrup in which particles of the macromonomer are completely dissolved in the vinyl monomer (b), a molded article having high transparency is obtained.

Further, in the method (B), since the recovery step of the macromonomer (a) can be omitted, the production steps can be shortened. That is, since the method (B) is a method in which copolymerization is performed by adding the vinyl monomer (b) to the suspension obtained by suspending the macromonomer (a) by suspension polymerization, a step of recovering the macromonomer (a) can be omitted. On the other hand, the method (A) is a method in which the macromonomer (a) is subjected to suspension polymerization and then particles of the macromonomer (a) are recovered. As the method for producing a polymer of the invention, from the viewpoint of obtaining a molded article having high transparency, the method (A) is preferably employed.

Even in any one of the method (A) and the method (B), it is preferable to perform heating when the macromonomer (a) is dissolved in the vinyl monomer (b).

The heating temperature when the macromonomer (a) is dissolved in the vinyl monomer (b) is preferably 30 to 90° C. When the heating temperature is 30° C. or higher, the solubility of the macromonomer (a) in the vinyl monomer (b) tends to be improved, and when the heating temperature is 90° C. or lower, volatilization of the monomer mixture (I-1) tends to be suppressed. The lower limit of the heating temperature is more preferably 35° C. or higher. In addition, the upper limit of the heating temperature is more preferably 75° C. or lower. That is, in a case in which the macromonomer (a) is dissolved in the vinyl monomer (b), the monomer mixture (I-1) is preferably heated to 30 to 90° C., and is more preferably heated to 35 to 75° C.

In a case in which a radical polymerization initiator is used when the monomer mixture (I-1) containing the macromonomer (a) is polymerized, the time point for adding a radical polymerization initiator is preferably after the macromonomer (a) is dissolved in the vinyl monomer (b). That is, it is preferable that after the monomer mixture (I-1) is prepared by dissolving the macromonomer (a) in the vinyl monomer (b), a radical polymerization initiator be added to the monomer mixture (I-1).

The temperature of the monomer mixture (I-1) at the time of adding a radical polymerization initiator is preferably 0° C. or higher, that is, a temperature equal to or lower than (10 hour half life temperature of the radical polymerization initiator to be used −15° C.). When the temperature at the time of adding a radical polymerization initiator is 0° C. or higher, the solubility of the radical polymerization initiator in the vinyl monomer (b) tends to be improved. Further, when the temperature at the time of adding a radical polymerization initiator is equal to or lower than (10 hour half life temperature of the radical polymerization initiator to be used −15° C.), there is a tendency that the polymerization can be stably performed.

Examples of the radical polymerization initiator include an organic peroxide and an azo compound.

Specific examples of the organic peroxide include 2,4-dichlorobenzoyl peroxide, t-butyl peroxypivalate, o-methylbenzoyl peroxide, bis-3,5,5-trimethylhexanoyl peroxide, octanoyl peroxide, t-butyl peroxy-2-ethylhexanoate, cyclohexanone peroxide, benzoyl peroxide, methyl ethyl ketone peroxide, dicumyl peroxide, lauroyl peroxide, diisopropylbenzene hydroperoxide, t-butyl hydroperoxide, and di-t-butyl peroxide.

Specific examples of the azo compound include 2,2'-azobisisobutyronitrile, 2,2'-azobis(2-methylbutyronitrile), 2,2'-azobis(2,4-dimethylvaleronitrile), and 2,2'-azobis(2,4-dimethyl-4-methoxyvaleronitrile).

Among the radical polymerization initiators described above, from the viewpoint of ease of availability, benzoyl peroxide, 2,2'-azobisisobutyronitrile, 2,2'-azobis(2-methylbutyronitrile), 2,2'-azobis(2,4-dimethylvaleronitrile), and 2,2'-azobis(2,4-dimethyl-4-methoxyvaleronitrile) are preferable.

The radical polymerization initiator can be used alone or in combination of two or more kinds thereof.

The added amount of the radical polymerization initiator is, from the viewpoint of controlling polymerization heat, preferably 0.0001 part by mass or more but 10 parts by mass or less, and more preferably 0.0005 part by mass or more but 5 parts by mass or less, with respect to 100 parts by mass of the total amount of the macromonomer (a) and the vinyl monomer (b).

In the method (A) or the method (B) described above, the polymerization temperature when the starting material composition (I) is subjected to suspension polymerization is not particularly limited as long as the effect of the invention is obtained, and generally, is preferably 50 to 120° C. and more preferably 70 to 100° C.

Further, the polymerization time is preferably 1 to 6 hours and more preferably 1.5 to 4 hours.

Further, the stirring condition is preferably 100 to 600 rpm and more preferably 150 to 500 rpm.

Examples of a dispersion agent which is used for suspension polymerization include an alkali metal salt of poly (meth)acrylic acid, a copolymer of an alkali metal salt of (meth)acrylic acid and a (meth)acrylic acid ester, a copolymer of an alkali metal salt of sulfoalkyl (meth)acrylate and a (meth)acrylic acid ester, an alkali metal salt of polystyrene sulfonic acid, a copolymer of an alkali metal salt of styrene sulfonic acid and a (meth)acrylic acid ester, a copolymer of an alkali metal salt of (meth)acrylic acid, an alkali metal salt of sulfoalkyl (meth)acrylate, an alkali metal salt of styrene sulfonic acid, and a (meth)acrylic acid ester, a copolymer of an alkali metal salt of (meth)acrylic acid, an alkali metal salt of sulfoalkyl (meth)acrylate, and a (meth)acrylic acid ester, a copolymer of an alkali metal salt of (meth)acrylic acid, an alkali metal salt of styrene sulfonic acid, and a (meth)acrylic acid ester, and a copolymer of an alkali metal salt of sulfoalkyl (meth)acrylate, an alkali metal salt of styrene sulfonic acid, and a (meth)acrylic acid ester; polyvinyl alcohol with a saponification degree of 70 to 100%; methyl cellulose; starch; and hydroxyapatite. These may be used alone or in combination of two or more kinds thereof. Among these, a copolymer of an alkali metal salt of sulfoalkyl (meth)acrylate and a (meth)acrylic acid ester having favorable dispersion stability during suspension polymerization is preferable.

In both the method (A) and the method (B), the content of the dispersion agent in an aqueous suspension is preferably 0.005 to 5% by mass and more preferably 0.01 to 1% by mass, with respect to the total mass of the aqueous suspension. When the content of the dispersion agent in the aqueous suspension is 0.005% by mass or more, dispersion stability of a suspension polymerization solution is favorable, and thus, washing properties, dewaterability, drying properties, and flowability of a polymer to be obtained tend to be improved. Further, when the content of the dispersion agent is 5% by mass or less, there is little foaming during polymerization, and thus, polymerization stability tends to be improved.

In the invention, for the purpose of improving dispersion stability of an aqueous suspension, an electrolyte such as sodium carbonate, sodium sulfate, or manganese sulfate may be added to the aqueous suspension. In this case, the ratio of these additives is preferably 0.01 to 0.5% by mass with respect to the total mass of the aqueous suspension in the case of the method (A). Further, in the case of the method (B), the preferred ratio of the electrolyte in the aqueous suspension is preferably 0.01 to 10% by mass.

In the method for producing a polymer of the invention, it is preferable to obtain a polymer by polymerizing the starting material composition (1) including the monomer mixture (I-1) and a non-metallic chain transfer agent to be described below.

<Non-Metallic Chain Transfer Agent>

The non-metallic chain transfer agent is added to the monomer mixture (I-1) when a polymer is obtained, and particularly, is preferably added when a polymer is obtained by a suspension polymerization method.

The present inventors found that when the non-metallic chain transfer agent is used as a chain transfer agent in producing of a polymer, an unreacted macromonomer included in the polymer can be decreased. The molecular weight distribution of a polymer polymerized by using a starting material composition containing such a non-metallic chain transfer agent is narrowed by decreasing the unreacted macromonomer. A molded article obtained from a molding material containing a polymer having such a narrow molecular weight distribution has a suppressed external haze and high transparency, which is particularly preferable.

Further, when the unreacted macromonomer in the polymer is decreased, resistance to thermal decomposition of the polymer is improved, and as a result, resistance to dwell-induced degradation of the polymer is also improved, which is preferable.

Further, when the unreacted macromonomer in the polymer is decreased, yellowing resistance of a molded article obtained from a molding material containing this polymer is also improved, which is preferable.

Examples of the non-metallic chain transfer agent include a sulfur-containing chain transfer agent such as t-dodecyl mercaptan or n-octyl mercaptan, α-methylstyrene dimer, carbon tetrachloride, and terpenoid. From the viewpoint of ease of availability and high chain transfer ability, a sulfur-containing chain transfer agent is preferable.

The content of the non-metallic chain transfer agent is preferably 0.01 to 0.5 part by mass with respect to 100 parts by mass of the monomer mixture (I-1).

When the content of the non-metallic chain transfer agent is 0.01 part by mass or more, transparency of a molded article obtained from the polymer of the invention tends to increase. Further, when the content of the non-metallic chain transfer agent is 0.5 part by mass or less, mechanical strength of a molded article tends to be maintained. The lower limit of the content of the non-metallic chain transfer agent is more preferably 0.03 part by mass or more, further preferably 0.05 part by mass or more, and particularly preferably 0.07 part by mass or more. The upper limit of the content of the non-metallic chain transfer agent is more preferably 0.3 part by mass or less, further preferably 0.2 part by mass or less, and particularly preferably 0.15 part by mass or less. That is, the ratio of the non-metallic chain transfer agent is preferably 0.01 to 0.5 part by mass, more preferably 0.03 to 0.3 part by mass, and particularly preferably 0.05 to 0.2 part by mass, with respect to 100 parts by mass of the monomer mixture (I-1).

(Polymer)

The polymer of the invention is obtained by the method for producing a polymer described above, and contains a copolymer of the macromonomer (a) and the vinyl monomer (b).

In the invention, the polymer may contain at least one selected from a polymer having only the unit of the macromonomer (a) (that is, a homopolymer of the macromonomer (a)), a polymer having only one kind of the vinyl monomer (b) (that is, a homopolymer of only one kind of the vinyl monomer (b)), a polymer having two or more kinds of the vinyl monomer (b) (that is, a copolymer of at least two kinds of the vinyl monomer (b)), an unreacted macromonomer (a), and an unreacted vinyl monomer (b).

Further, the polymer preferably contains at least one copolymer selected from a block copolymer having the unit of the macromonomer (a) and the unit of the vinyl monomer (b) and a graft copolymer of the vinyl monomer (b), the graft copolymer having the unit of the macromonomer (a) in a side chain. Further, from the viewpoint of obtaining a molded article having high elongation at break, it is more preferable to contain a graft copolymer of the vinyl monomer (b), the graft copolymer having the unit of the macromonomer (a) in a side chain.

As described above, the polymer obtained by the method for producing a polymer of the invention has a feature that the content of the unreacted macromonomer (a) in the polymer is small. According to this, effects of decreasing a haze value of a molded article obtained by using the polymer of the invention and improving resistance to dwell-induced degradation thereof can be obtained.

The Mw of the polymer is preferably 30,000 or more but 1,250,000 or less. When the Mw of the polymer is 30,000 or more, mechanical strength of a molded article obtained by molding this polymer tends to be improved. Further, when the Mw of the polymer is 1,250,000 or less, transparency of a molded article to be obtained tends to be improved. The lower limit of the Mw of the polymer is more preferably 75,000 or more, and further preferably 100,000 or more. The upper limit of the Mw of the polymer is more preferably 1,000,000 or less, and further preferably 900,000 or less. That is, in an aspect of the invention, the mass average molecular weight of the polymer is preferably 30,000 or more but 1,250,000 or less, more preferably 75,000 or more but 1,000,000 or less, and particularly preferably 100,000 or more but 900,000 or less. The mass average molecular weight of the polymer means a value calculated from a calibration curve obtained by using polymethyl methacrylate (PMMA) (four kinds of peak top molecular weight (Mp) 141,500, 55,600, 10,290, and 1,590) by means of gel permeation chromatography (GPC).

In an aspect of the invention, the molecular weight distribution (mass average molecular weight/number average molecular weight) of the polymer is preferably 23 or less, preferably 15 or less, and particularly preferably 10 or less. When the molecular weight distribution is 23 or less, a haze value of a molded article obtained from a molding material containing the polymer of the invention is decreased, and thus transparency is improved, which is preferable. Further, the above range is preferable since the resistance to dwell-induced degradation of the polymer is improved.

Further, the lower limit of the molecular weight distribution of the polymer is preferably 2 or more.

In an aspect of the invention, the 5% by mass reduction temperature of the polymer is preferably 280° C. or higher, more preferably 300° C. or higher, and particularly preferably 320° C. or higher. When the 5% by mass reduction temperature of the polymer is 280° C. or higher, a molded article having exceptional resistance to dwell-induced degradation is easily obtained, which is preferable. The upper limit value of the 5% by mass reduction temperature of the polymer is preferably 500° C. or lower.

The 5% by mass reduction temperature is an index of heat resistance of the polymer, and can be obtained by performing thermal analysis using a thermal analyzer (TG/DTA) under conditions including a measurement temperature of 100 to 500° C. and a temperature increasing rate of 10° C./min and then measuring temperature at the time point when the mass before measurement is decreased by 5% by mass.

In an aspect of the invention, the melt index retention rate (hereinafter, also referred to as the "MI retention rate") of the polymer is preferably 95 to 110%, and particularly preferably 97 to 108%. When the MI retention rate is 95 to 110%, resistance to dwell-induced degradation is excellent, which is preferable.

The MI retention rate is a value as an index of resistance to thermal decomposition of the polymer. The MI retention rate can be obtained by measuring a melt index of the polymer at a load of 5 kgf and a temperature of 180° C. using a melt indexer and assigning a measurement value to the following Formula (8).

$$\text{MI retention rate (\%)} = MI_{10}MI_3 \times 100 \qquad (8)$$

(In Formula (8), $MI_{10}$ is a value of the melt index when the polymer dwells in the cylinder of the melt indexer for 10 minutes, and $MI_3$ is a value of the melt index when the polymer dwells in the cylinder of the melt indexer for 3 minutes.)

The MI retention rate closer to 100 means that resistance to dwell-induced degradation of the polymer is favorable. On the other hand, when the MI retention rate is substantially below 100, that is, less than 90, there is a high possibility that gelation of the polymer progresses and the viscosity of a resin which has been melt in injection molding tends to increase, which is not preferable. Further, when the MI retention rate is substantially above 100, that is, more than 120, there is a possibility that decomposition of low molecular weight components contained in the polymer progresses in the melt indexer. When injection molding is performed by using such a polymer, a large amount of gas is generated in molding and this may cause insufficient filling or a silver streak, which is not preferable. When the MI retention rate of the polymer is 95 to 110%, dwell-induced degradation tends to be improved.

In an aspect of the invention, the elastic modulus of the polymer is preferably 1,000 MPa or less, more preferably 500 MPa or less, and particularly preferably 100 MPa or less. When the elastic modulus of the polymer is 1,000 MPa or less, the polymer is pliable and an effect of high workability can be obtained, which is preferable. Herein, the elastic modulus of the polymer means an average value of a tangent line of a stress distortion curve when a tensile test is performed according to JIS K6251 on a test piece obtained from the polymer at a temperature condition of 20 to 28° C. and a tension rate of 20 mm/min.

As the polymer of the invention can be obtained by a polymerization method which does not use a metal catalyst or the like, it can be preferably used in a molded article having exceptional transparency and a molding material for obtaining a molded article.

<Molded Article>

The molded article of the invention is obtained by molding a molding material containing the polymer obtained by the production method.

The ratio of the polymer in the molding material is preferably 5 to 100% by mass, and more preferably 20 to 80% by mass.

To the molding material, other polymers other than the above-described polymer can be added as necessary.

Examples of the other polymers include a (meth)acrylic polymer such as PMMA, polyolefin, polyamide, unsaturated polyester, saturated polyester such as polyethylene terephthalate or polybutylene terephthalate, polycarbonate, and polyvinylidene fluoride. The ratio of other polymers in the molding material is preferably 0 to 95% by mass, and more preferably 20 to 80% by mass, with respect to the total mass of the molding material.

Examples of a method for mixing the polymer with other polymers include a physical mixing method using a Henschel mixer, a blender, or the like and a melt mixing method using an extruder or the like.

Further, in an aspect of the invention, for molding, the molding material can be blended with, as necessary, various stabilizing agents such as an anti-oxidant, an UV absorbing agent, and a heat stabilizing agent; coloring agents such as an inorganic pigment, an organic pigment, and a dye; conductivity imparting agents such as carbon black and ferrite; and various additives such as an inorganic filler, a lubricant, a plasticizer, organic peroxide, a neutralizing agent, and a cross-linking agent. The ratio of these various additives is preferably 0 to 20% by mass and more preferably 1 to 5% by mass, with respect to the total mass of the molding material.

Examples of the shape of the molded article include a sheet shape and a three-dimensional shape.

As a molding method for obtaining the molded article, a melt molding method is preferable, and examples of the molding method for obtaining the molded article include an injection molding method, a compression molding method, a hollow molding method, an extrusion molding method, a rotary molding method, a flow casting method, and a solvent casting method. Among these, extrusion molding is preferable.

Further, in an aspect to the invention, the haze value of the molded article is preferably 0 to 15% and more preferably 0.1 to 1.5%. The haze value of the molded article indicates a value measured according to JIS K7136 by using a haze meter.

Further, in an aspect of the invention, a yellow index (hereinafter, also referred to as "YI") serving as an index of yellowing resistance is preferably 1 to 15 and more preferably 1.1 to 3.

Another aspect of the invention is as follows.

<1> A method for producing a polymer, the method including performing suspension polymerization on a starting material composition (I) that includes a monomer mixture (I-1) containing a macromonomer (a) represented by the above-described Formula (1) and a vinyl monomer (b), a non-metallic chain transfer agent, a radical polymerization initiator, and a dispersion agent in water to produce a polymer containing a block copolymer of the macromonomer (a) and the vinyl monomer (b), in which a content of the non-metallic chain transfer agent is 0.01 to 0.5 part by mass with respect to 100 parts by mass of the monomer mixture (I-1), and the method includes a step (1) of mixing the monomer mixture (I-1) containing the macromonomer (a) and the vinyl monomer (b) with the non-metallic chain transfer agent, a step (2) of preparing a syrup dispersion of the starting material composition (I) by adjusting the temperature of the composition obtained in the step (1) to 40 to 70° C., adding the radical polymerization initiator thereto, and then adding an aqueous suspension containing a dispersion agent thereto, a step (3) of obtaining a suspension containing the polymer from the syrup dispersion of the starting material composition (I), and a step (4) of recovering the polymer from the suspension containing the polymer.

<2> The method for producing a polymer described in <1>, in which the non-metallic chain transfer agent is at least one sulfur-containing chain transfer agent selected from the group consisting of t-dodecyl mercaptan and n-octyl mercaptan.

<3> The method for producing a polymer described in <1> or <2>, in which a ratio of the macromonomer (a) is 15 to 60% by mass with respect to the total mass of the monomer mixture (I-1) and a ratio of the vinyl monomer (b) is 40 to 80% by mass with respect to the total mass of the monomer mixture (I-1).

<4> The method for producing a polymer described in any one of <1> to <3>, in which the macromonomer (a) is a macromonomer of a copolymer of MMA and MA, and the vinyl monomer (b) is at least one (meth)acrylic acid ester selected from the group consisting of MMA, MA, and BA.

<5> The method for producing a polymer described in any one of <1> to <4>, in which a step (A) of preparing the macromonomer (a) is included before the step (1), and the step (A) includes a step of preparing a starting material composition (II) that includes: a dispersion agent; a water-soluble salt; a monomer composition (II-1) containing a (meth)acrylic acid ester; a cobalt chain transfer agent; and a polymerization initiator and performing suspension polymerization on the starting material composition (II) at 70 to 100° C. for 2 to 7 hours.

<6> A polymer obtained by the method for producing a polymer described in any one of <1> to <5>.

EXAMPLES

Hereinafter, the invention will be described by means of examples. Incidentally, in the following description, "part" represents "part by mass." In addition, the Mw, the Mn, thermogravimetric analysis, and the melt index (MI) of a polymer and the yellow index (YI), the haze, the elastic modulus, and an elongation at break of a molded article were evaluated by the following methods.

(Evaluation of Polymer)
(1) Mw and Mn

The Mw and the Mn of the polymer were measured under the following conditions by using gel permeation chromatography (GPC) (manufactured by TOSOH CORPORATION, trade name: HLC-8220).

Column: TSK GUARD COLUMN SUPER HZ-L (4.6×35 mm) and two TSK-GEL SUPER HZM-N (6.0×150 mm) were connected in series.

Eluent: THF
Measurement temperature: 40° C.
Flow rate: 0.6 mL/min

Incidentally, a calibration curve was prepared by using PMMA manufactured by Polymer Laboratories (four kinds of Mp (peak top molecular weight)=141,500, 55,600, 10,290, and 1,590), and the Mw and the Mn of the polymer were obtained by using the calibration curve.

(2) Thermogravimetric Analysis

The 1% by mass reduction temperature (Td1) and the 5% by mass reduction temperature (Td5) of the polymer were measured by using TG/DTA (manufactured by Seiko Instruments Inc., trade name: TG/DTA6300, measurement temperature: 100 to 500° C. (temperature increasing rate: 10° C./min), flow rate: nitrogen 20 mL/min).

(3) MI

The MI of the polymer at a load of 5 kgf and a temperature of 180° C. was measured by using a melt indexer (MI) (manufactured by TECHNOL SEVEN CO., LTD., trade name: L244), the MI retention rate represented by Formula (8) was measured, and then the dwell-induced degradation was evaluated.

$$\text{MI retention rate}=MI_{10}/MI_3 \times 100 \quad (8)$$

$MI_{10}$: MI value at the time of retention in a cylinder for 10 minutes $MI_3$: MI value at the time of retention in a cylinder for 3 minutes (Evaluation of Molded Article)
(1) YI Regarding the YI of the molded article, a test piece obtained by cutting the molded article having a thickness of 3 mm into a size of 5 cm square was measured by using an instantaneous multiple photometric system (manufactured by Otsuka Electronics Co., Ltd., trade name: MCPD-3000), and the yellowing resistance was evaluated.

(2) Haze Value (HZ)

The haze value (HZ) of a test piece obtained by cutting the molded article into a size of 5 cm square was measured by using a haze meter (manufactured by NIPPON DENSHOKU INDUSTRIES CO., LTD., trade name: NDH2000) according to JIS K7136.

(3) Total Light Transmittance (TT)

The total light transmittance (TT) of a test piece obtained by cutting the molded article into a size of 5 cm square was measured by using a haze meter (manufactured by NIPPON DENSHOKU INDUSTRIES CO., LTD., trade name: NDH2000) according to JIS K7361.

(4) Elastic Modulus

Five test pieces of Dumbbell-form No. 1 type molded article were prepared according to JIS K6251 by using Super Dumbbell Cutter (manufactured by DUMBBELL CO., LTD., trade name: SDK-100D). A tensile test was performed five times on the obtained five test pieces by using Strograph T (manufactured by Toyo Seiki Seisaku-sho, Ltd., trade name) under conditions including a room temperature of 23° C. and a tension rate of 500 mm/min, an average value of a tangent line of a stress distortion curve at this time was obtained as an elastic modulus, and pliability was evaluated.

(5) Elongation at Break

Five test pieces of Dumbbell-form No. 1 type molded article were prepared according to JIS K6251 by using Super Dumbbell Cutter (manufactured by DUMBBELL CO., LTD., trade name: SDK-100D). A tensile test was performed five times on the obtained five test pieces by using Strograph T (manufactured by Toyo Seiki Seisaku-sho, Ltd., trade name) under conditions including a room temperature of 23° C. and a tension rate of 500 mm/min, an average value was obtained as an elongation rate at break.

[Production Example 1] Synthesis of Dispersion Agent (1)

Into a reaction vessel (volume: 1200 L) equipped with a stirrer, a condenser, and a thermometer, 61.6 parts of 17% aqueous solution of potassium hydroxide, 19.1 parts of ACRYESTER M (trade name, methyl methacrylate, manufactured by MITSUBISHI RAYON CO., LTD.), and 19.3 parts of deionized water were added. Subsequently, the solution in a reaction apparatus was stirred at room temperature, the exothermic peak was determined, and stirring was further continued for 4 hours. Thereafter, the reaction solution in the reaction apparatus was cooled to room temperature to obtain an aqueous solution of potassium methacrylate.

Subsequently, into a reaction vessel (volume: 1,050 L) equipped with a stirrer, a condenser, and a thermometer, 900 parts of deionized water, 60 parts of ACRYESTER SEM-Na (trade name, sodium 2-sulfoethyl methacrylate, manufactured by MITSUBISHI RAYON CO., LTD.), 10 parts of the above aqueous solution of potassium methacrylate, and 12 parts of ACRYESTER M were added followed by stirring. The temperature was raised to 50° C. while purging the inside of a polymerization apparatus with nitrogen. As a polymerization initiator, 0.08 part of V-50 (trade name, 2,2'-azobis(2-methylpropionamidine) dihydrochloride acid salt, manufactured by Wako Pure Chemical Industries, Ltd.) was added thereto and the temperature was further raised to 60° C. After raising the temperature, ACRYESTER M was continuously added dropwise thereto for 75 minutes at a rate of 0.24 part/minute using a dropping pump. After being maintained at 60° C. for 6 hours, the reaction solution was cooled to room temperature to obtain a dispersion agent (1) as a transparent aqueous solution with a solid content of 10% by mass.

[Production Example 2] Synthesis of Co Complex (1) (Cobalt Chain Transfer Agent)

Into a synthesis apparatus equipped with a stirring device, 2.00 g (8.03 mmol) of cobalt (II) acetate tetrahydrate (manufactured by Wako Pure Chemical Industries, Ltd., Wako Special grade), 3.86 g (16.1 mmol) of diphenyl glyoxime (manufactured by Tokyo Chemical Industry Co., Ltd., EP grade), and 100 ml of diethyl ether from which oxygen has been removed in advance by nitrogen bubbling were added and stirred for 2 hours at room temperature.

Subsequently, 20 ml of diethyl ether boron trifluoride complex (manufactured by Tokyo Chemical Industry Co., Ltd., EP grade) was added and further stirred for 6 hours. The resultant was filtered, and the solid was washed with diethyl ether and dried for 12 hours at 20° C. and 100 Mpa or less to obtain 5.02 g (7.93 mmol, yield: 99% by mass) of a Co complex (1) as a brown solid.

[Production Example 3] Synthesis of Macromonomer (a-1)

Into a polymerization apparatus equipped with a stirrer, a condenser, and a thermometer, 145 parts of deionized water, 0.1 part of sodium sulfate ($Na_2SO_4$), and 0.26 part of the dispersion agent (1) (solid content: 10% by mass) produced in Production Example 1 were added followed by stirring to obtain a homogenous aqueous solution.

Next, 95 parts of ACRYESTER M, 5 parts of methyl acrylate (MA) (manufactured by Mitsubishi Chemical Corporation), 0.0016 part of the Co complex (1) produced in Production Example 2, and 0.1 part of PEROCTA O (trade name, 1,1,3,3-tetramethylbutylperoxy2-ethylhexanoate, manufactured by NOF CORPORATION) as a polymerization initiator were added to obtain an aqueous dispersion. Subsequently, the inside of the polymerization apparatus was sufficiently purged with nitrogen and the temperature of the aqueous dispersion was raised to 80° C. The aqueous dispersion was maintained for 4 hours, and then the temperature of the aqueous dispersion was raised to 92° C. and maintained for 2 hours. Thereafter, the reaction solution was cooled to 40° C. to obtain an aqueous suspension of the macromonomer. The aqueous suspension of the macromonomer was filtered through a filter cloth, and the filtrate was washed with deionized water and dried at 40° C. for 16 hours, thereby obtaining a macromonomer (a-1). The Mw of the macromonomer (a-1) was 32,100, and the Mn thereof was 17,000.

TABLE 1

|  | Composition | | Evaluation result | |
| --- | --- | --- | --- | --- |
|  | MMA | MA | Mw | Mn |
| Macromonomer (a-1) | 95 | 5 | 32,100 | 17,000 |

MMA: methyl methacrylate (manufactured by MITSUBISHI RAYON CO., LTD., trade name: ACRYESTER M)
MA: methyl acrylate (manufactured by Mitsubishi Chemical Corporation)

Example 1

An aqueous suspension was prepared by mixing 145 parts of deionized water, 0.1 part of sodium sulfate, and 0.26 part of the dispersion agent (1) produced in Production Example 1.

To a separable flask with a condensing tube, 40 parts of the macromonomer (a-1), 36 parts of n-butyl acrylate (nBA) (manufactured by Mitsubishi Chemical Corporation, trade name) and 24 parts of ACRYESTER M as the vinyl monomers, 0.2 part of n-octyl mercaptan (n-OM) (manufactured by KANTO CHEMICAL CO., INC., trade name) as the non-metallic chain transfer agent were added and the temperature was raised to 50° C. under stirring to obtain a composition. After the obtained composition was cooled to 40° C. or lower, 0.3 part of AMBN (trade name, 2,2'-azobis (2-methylbutyronitrile), manufactured by Otsuka Chemical Co., Ltd.) was dissolved in the composition, thereby obtaining a starting material composition (1).

Subsequently, after the above-described aqueous suspension was added to the starting material composition (I), by performing flushing of the atmosphere inside the separable flask with nitrogen by nitrogen bubbling and increasing the revolution number for stirring, a syrup dispersion was obtained.

The syrup dispersion was heated to 75° C. and the outside temperature of the separable flask was maintained. Once there was a polymerization exothermic peak, the syrup dispersion was heated to 85° C. when the syrup dispersion reached 75° C. By maintaining the syrup dispersion for 30 minutes, the polymerization was completed and a suspension was obtained.

After the suspension was cooled to 40° C. or lower, the suspension was filtered through a filter cloth, and the filtrate was washed with deionized water. Thereafter, the filtrate was dried at 40° C. for 16 hours to obtain a polymer. The Mw of the polymer was 139,000, and the number average molecular weight thereof was 39,000.

The polymer was extruded at 180° C. by a φ30 mm biaxial extruder (manufactured by TOSHIBA MACHINE ENGINEERING CO., LTD., trade name: TEM-35B) to obtain a pellet-shaped molding material. The obtained molding material was molded by melt extrusion using a φ30 mm monoaxial extruder and a T die of L/D25 (manufactured by GM Engineering, Inc.) at 180° C., thereby obtaining a molded article having a thickness of 50 μm.

The evaluation results of the polymer and the molded article are presented in Table 2.

Examples 2 to 11

A polymer and a molded article were produced in the same operation as in Example 1, except that the composition of the polymer and the added amount of the non-metallic chain transfer agent were changed as presented in Table 2. The evaluation results of the obtained polymer and the obtained molded article are presented in Table 2.

However, the molded articles of Examples 9 to 11 were not evaluated.

Comparative Example 1

A polymer and a molded article were produced in the same operation as in Example 1, except that the polymer was changed as presented in Table 2. The evaluation results of the obtained polymer and the obtained molded article are presented in Table 2.

Comparative Example 2

The evaluation results of HBS-006 (manufactured by MITSUBISHI RAYON CO., LTD., trade name) as a core-shell-type rubber-containing film having a thickness of 50 an are presented in Table 2.

TABLE 2

| | | | | Example 1 | Example 2 | Example 3 | Example 4 | Example 5 | Example 6 | Example 7 |
|---|---|---|---|---|---|---|---|---|---|---|
| Polymer | Starting material composition (I) (part) | Macromonomer (a) | | 40 | 40 | 40 | 30 | 40 | 20 | 30 |
| | | Vinyl monomer (b) | MMA | 24 | 24 | 24 | 28 | 12 | 48 | 42 |
| | | | MA | 0 | 0 | 0 | 0 | 0 | 0 | 0 |
| | | | BA | 36 | 36 | 36 | 42 | 48 | 32 | 28 |
| | | Radical polymerization | AMBN | 0.3 | 0.3 | 0.3 | 0.3 | 0.3 | 0.3 | 0.3 |
| | | Chain transfer agent | n-OM | 0.2 | 0.1 | 0.05 | 0.1 | 0.1 | 0.1 | 0.1 |
| | | Content (X) of vinyl monomer (b-1) in vinyl monomer (b) [wt %] | | 40 | 40 | 40 | 40 | 20 | 60 | 60 |
| | | Content (Y) of macromonomer (a) in monomer mixture (1-1) [wt %] | | 40 | 40 | 40 | 30 | 40 | 20 | 30 |
| | Evaluation result | Number average molecular weight | | 39,000 | 50,000 | 58,000 | 52,000 | 53,000 | 65,000 | 56,000 |
| | | Mass average molecular weight | | 139,000 | 326,000 | 837,000 | 195,000 | 269,000 | 172,000 | 158,000 |
| | | Molecular weight distribution (Mw/Mn) | | 3.5 | 6.5 | 14.4 | 3.8 | 5.1 | 2.6 | 2.8 |
| | | Td1 [° C.] | | 257 | 266 | 262 | 286 | 195 | 177 | 280 |
| | | Td5 [° C.] | | 330 | 326 | 315 | 318 | 265 | 302 | 318 |
| | | MI$_3$ [g] | | 19.7 | 12.9 | 13.1 | 44.1 | 33.8 | 8.6 | 11.2 |
| | | MI$_{10}$ [g] | | 21.6 | 13.1 | 13.1 | 41.6 | 38.5 | 9.8 | 13.1 |
| | | MI retention rate [%] | | 109 | 102 | 100 | 94 | 114 | 113 | 117 |
| Evaluation result of molded article | | Yellow index [−] | | 2.3 | 2.2 | 2.2 | 9.2 | 10.4 | 1.4 | 2.0 |
| | | Haze value [%] | | 3.2 | 2.5 | 5.8 | 1.1 | 3.6 | 1.1 | 0.8 |
| | | Total light transmittance [%] | | 92.6 | 92.6 | 92.4 | 92.5 | 91.5 | 92.5 | 92.5 |
| | | Elastic modulus [MPa] | | 451 | 463 | 625 | 151 | 47 | 1416 | 1531 |
| | | Elongation at break [%] | | 42 | 93 | 114 | 87 | 112 | 12 | 6 |

| | | | | Example 8 | Example 9 | Example 10 | Example 11 | Comparative Example 1 | Comparative Example 2 |
|---|---|---|---|---|---|---|---|---|---|
| Polymer | Starting material composition (I) (part) | Macromonomer (a) | | 40 | 26 | 26 | 26 | 40 | — |
| | | Vinyl monomer (b) | MMA | 36 | 24 | 24 | 38 | 24 | — |
| | | | MA | 0 | 14 | 14 | 0 | 0 | — |
| | | | BA | 24 | 36 | 36 | 36 | 36 | — |
| | | Radical polymerization | AMBN | 0.3 | 0.5 | 0.3 | 0.2 | 0.3 | — |
| | | Chain transfer agent | n-OM | 0.1 | 0.10 | 0.20 | 0.10 | 0 | — |
| | | Content (X) of vinyl monomer (b-1) in vinyl monomer (b) [wt %] | | 60 | 32.40 | 32.40 | 51.40 | 40 | |
| | | Content (Y) of macromonomer (a) in monomer mixture (1-1) [wt %] | | 40 | 26 | 26 | 26 | 40 | — |
| | Evaluation result | Number average molecular weight | | 42,000 | 75,600 | 82,300 | 65,400 | 61,000 | — |
| | | Mass average molecular weight | | 108,000 | 1,150,000 | 1,240,000 | 607,000 | 1,501,000 | — |
| | | Molecular weight distribution | | 2.6 | 15.2 | 15 | 9.2 | 24.7 | — |
| | | Td1 [° C.] | | 212 | 257 | 266 | 262 | 174 | 280 |
| | | Td5 [° C.] | | 321 | 330 | 326 | 315 | 276 | 324 |
| | | MI$_3$ [g] | | 17.8 | 19.7 | 12.9 | 13.1 | 2.49 | — |
| | | MI$_{10}$ [g] | | 18.9 | 21.6 | 13.1 | 13.1 | 2.93 | — |
| | | MI retention rate [%] | | 106 | 109 | 102 | 100 | 118 | — |
| Evaluation result of molded article | | Yellow index [−] | | 1.1 | 2.3 | 2.2 | 2.2 | 3.21 | — |
| | | Haze value [%] | | 0.3 | — | — | — | 14.8 | 1.1 |
| | | Total light transmittance [%] | | 92.3 | — | — | — | 91.6 | 92.5 |
| | | Elastic modulus [MPa] | | 1600 | — | — | — | 925 | 1,230 |
| | | Elongation at break [%] | | 3 | — | — | — | 49 | 117 |

Abbreviations in Table 2 are as follows.

MMA: methyl methacrylate (manufactured by MITSUBISHI RAYON CO., LTD., trade name: ACRYESTER M)

BA: n-butyl acrylate (manufactured by Mitsubishi Chemical Corporation, trade name: nBA)

AMBN: 2,2′-azobis(2-methylbutyronitrile) (manufactured by Otsuka Chemical Co., Ltd., trade name)

n-OM: n-octyl mercaptan (manufactured by KANTO CHEMICAL CO., INC., trade name)

HBS-006: core-shell-type rubber-containing film (manufactured by MITSUBISHI RAYON CO., LTD., product name)

The polymer obtained by the method for producing a polymer of the invention had exceptional resistance to dwell-induced degradation. In addition, the molded article obtained by using the polymer of the invention had a low yellow index value and exceptional yellowing resistance. Furthermore, the molded article of the invention had a low haze value and exceptional transparency. That is, the polymer obtained by the method for producing a polymer of the invention had exceptional resistance to dwell-induced degradation and yellowing resistance, and when the polymer was used as a molding material, the molded article having a low haze value and exceptional transparency was obtained. On the other hand, in Comparative Example 1 in which a non-metallic chain transfer agent was not added to the starting material composition (I), the obtained polymer had poor yellowing resistance. Further, the molded article obtained by using the polymer had a high haze value. In addition, the core-shell type-containing film of Comparative Example 2 had exceptional transparency but poor pliability.

The invention claimed is:

1. A method for producing a polymer, comprising:
polymerizing a starting material composition (I) comprising a monomer mixture (I-1) comprising a macromonomer (a) represented by a Formula (1) and a vinyl monomer (b) and 0.07 to 0.5 parts by mass of a non-metallic chain transfer agent with respect to 100 parts by mass of the monomer mixture (I-1):

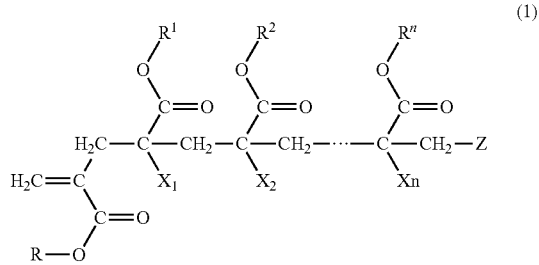

(1)

wherein in Formula (1),
R and $R^1$ to $R^n$ each independently represent an alkyl group having 1 to 4 carbon atoms,
$X_1$ to $X_n$ each independently represent a hydrogen atom or a methyl group,
Z represents a terminal group, and
n represents an integer of 3 to 5,000,
wherein the vinyl monomer (b) includes a vinyl monomer (b-1) having a Tg of homopolymer of 25° C. or higher and a vinyl monomer (b-2) having a Tg homopolymer of lower than 25° C., and
a content (X % by mass) of the vinyl monomer (b-1) in the vinyl monomer (b) satisfy the following Formula (3):

$$20 \leq X \leq 75 \tag{3},$$

wherein the macromonomer (a) is represented in the above-described Formula (1), R and $R^1$ to $R^n$ represent an alkyl group, $X_1$ to $X_n$ each independently represent a hydrogen atom or a methyl group,
wherein the non-metallic chain transfer agent is sulfur-containing chain transfer agent,
wherein the monomer mixture (I-1) comprises 15 to 60% by weight of the macromonomer (a), and 40 to 85% by weight of the mixture of vinyl monomers (b),
wherein the polymerization of the starting material composition (I) is performed by suspension polymerization,
wherein the macromonomer (a) is obtained by polymerizing a starting material composition (II) that includes: a monomer composition (II-1) containing a (meth)acrylic acid ester; and a cobalt chain transfer agent,
wherein the monomer composition (II-1) contains 85 to 99% by mass of methacrylic acid ester and 1 to 15% by mass of acrylic acid ester with respect to the total mass of the monomer composition (II-1), and,
wherein a 5% by mass reduction temperature of a polymer produced by the method for producing a polymer is 280° C. or higher.

2. The method according to claim 1, wherein
the vinyl monomer (b) comprises a vinyl monomer (b-1) having a Tg of homopolymer of 25° C. or higher and a vinyl monomer (b-2) having a Tg of homopolymer of lower than 25° C., and
a content (X % by mass) of the vinyl monomer (b-1) in the vinyl monomer (b) and a content (Y % by mass) of the macromonomer (a) in the monomer mixture (I-1) satisfy Formulae (2) and (3):

$$45 \geq Y \geq -0.5X+45 \tag{2}$$

$$5 \leq X \leq 55 \tag{3}.$$

3. The method according to claim 2, wherein the vinyl monomer (b) comprises a (meth)acrylic acid ester.

4. The method according to claim 1, wherein
the vinyl monomer (b) comprises a vinyl monomer (b-1) having a Tg of homopolymer of 25° C. or higher and a vinyl monomer (b-2) having a Tg of homopolymer of lower than 25° C., and
a content (X % by mass) of the vinyl monomer (b-1) in the vinyl monomer (b) and a content (Y % by mass) of the macromonomer (a) in the monomer mixture (I-1) satisfy Formulae (4) and (5):

$$45 \geq Y \geq -X+75 \tag{4}$$

$$30 < X < 75 \tag{5}$$

5. The method according to claim 4, wherein the vinyl monomer (b) comprises a (meth)acrylic acid ester.

6. The method according to claim 1, wherein the vinyl monomer (b) comprises a (meth)acrylic acid ester.

7. The method according to claim 1,
wherein the content (X % by mass) of the vinyl monomer (b-1) in the vinyl monomer (b) satisfy the following Formula (3):

$$20 \leq X \leq 60 \tag{3}.$$

8. The method according to claim 1,
wherein a molded article obtained by molding a molding material comprising the polymer has a haze value with less than 3.6%, or a yellow index with less than 10.4.

9. The method according to claim 8,
wherein the molded article has a haze value with 0.1 to 1.5%.

10. The method according to claim 8,
wherein the molded article has a yellow index with 1.1 to 3.

11. The method according to claim 1,
wherein R and $R_1$ to $R_n$ represent a methyl group, $X_1$ to $X_n$ each independently represent a hydrogen atom or a methyl group, and n is 3 to 5000,
wherein the non-metallic chain transfer agent is sulfur-containing chain transfer agent,
wherein the monomer mixture (I-1) comprising 20 to 40% by weight of the macromonomer (a), and 60 to 80% by weight of the mixture of vinyl monomers (b).

12. A method for producing a polymer, comprising:
polymerizing a starting material composition (I) that includes a monomer mixture (I-1) containing a macromonomer (a) represented by the following Formula (1) and a vinyl monomer (b) and 0.07 to 0.5 parts by mass of a non-metallic chain transfer agent with respect to 100 parts by mass of the monomer mixture (I-1):

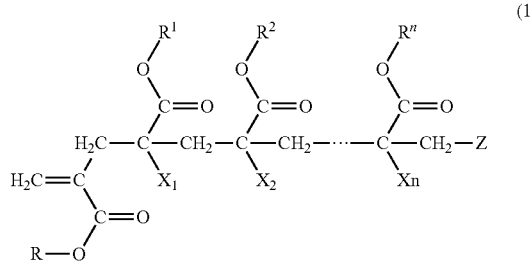

(1)

wherein in Formula (1),
R and $R^1$ to $R^n$ each independently represent a hydrogen atom, an alkyl group, a cycloalkyl group, an aryl group, or a heterocyclic group,
$X_1$ to $X_n$ each independently represent a hydrogen atom or a methyl group,
represents a terminal group, and
n represents an integer of 3 to 5,000,
wherein the vinyl monomer (b) includes a vinyl monomer (b-1) having a Tg of homopolymer of 100° C. or higher and a vinyl monomer (b-2) having a Tg of homopolymer of lower than 25° C.,
a content (X % by mass) of the vinyl monomer (b-1) in the vinyl monomer (b) and a content (Y % by mass) of the macromonomer (a) in the monomer mixture (I-1) satisfy the following Formulae (2), (4) and (6):

$$45 \geq Y \geq -0.5X+45 \qquad (2)$$

$$45 \geq Y \geq -X+75 \qquad (4)$$

$$30 \leq X \leq 55 \qquad (6),$$

wherein the polymerization of the starting material composition (I) is performed by suspension polymerization,
wherein the macromonomer (a) is obtained by polymerizing a starting material composition (II) that includes: a monomer composition (II-1) containing a (meth)acrylic acid ester; and a cobalt chain transfer agent,
wherein the monomer composition (II-1) contains 85 to 99% by mass of methacrylic acid ester and 1 to 15% by mass of acrylic acid ester with respect to the total mass of the monomer composition (II-1), and,
wherein a 5% by mass reduction temperature of a polymer produced by the method for producing a polymer is 280° C. or higher.

* * * * *